Patented Aug. 23, 1938

2,128,195

UNITED STATES PATENT OFFICE 2,128,195

AMINO-NITRO-CYCLOHEXYL-PHENOLS

Frank B. Smith, Midland, Mich., assignor to The Dow Chemical Company, Midland, Mich., a corporation of Michigan No Drawing. Application March 20, 1937, Serial No. 132,083

5 Claims. (Cl. 260—575)

This invention concerns amino-nitro-cyclohexyl-phenols having the following formula:—

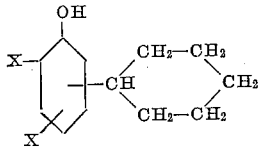

wherein one X represents an amino group and the other X represents a nitro group.

These compounds are crystalline in nature and yellow to orange-brown in color. They are substantially insoluble in water and soluble in acids, alkalies, and most common organic solvents. I have prepared certain of these new compounds, determined certain properties thereof whereby they may be readily identified, and found them to be particularly valuable in the control of insect pests.

The amino-nitro-cyclohexyl-phenols may be prepared by reducing a dinitro-cyclohexyl-phenol compound, and thereafter separating the desired nitro-amino derivative.

In preparing these new compounds, I reduce dinitro-cyclohexyl-phenol with an alcoholic or aqueous alcoholic solution of stannous chloride and hydrochloric acid at temperatures not greatly in excess of 40° C. The desired amino-nitro-cyclohexyl-phenol product is thereafter obtained by any of the usual methods emloyed for the isolation of amino derivatives from such a reducing mixture.

The following examples are illustrative of various modes in which I may apply my invention, but are not to be construed as limiting the same.

Example 1

59.4 grams of 2,4-dinitro-6-cyclohexyl-phenol (described in Britton et al., U. S. Patent 1,880,404) was made into a slurry with 250 milliliters of ethyl alcohol, and a reducing mixture consisting of 151.5 grams of stannous chloride ($SnCl_2 \cdot H_2O$), 118 grams of concentrated hydrochloric acid, and 200 milliliters of ethyl alcohol added slowly thereto through a dropping funnel over a period of two hours and at a temperature of 25°–30° C. with stirring. The reduction mixture was then heated at 35–40° C. for two hours, cooled, and filtered to separate a small amount of unreacted 2,4-dinitro-6-cyclohexyl-phenol. The filtrate was diluted with an equal volume of concentrated hydrochloric acid, filtered, and cooled to approximately 0°, whereupon the hydrochloride of the desired compound precipitated out of solution. This precipitate was filtered off and washed with a little concentrated hydrochloric acid to obtain an amino-nitro-2-cyclohexyl-phenol hydrochloride in the form of fine, white crystals. This product was then stirred with an excess of water to liberate the free phenol, which was recovered by filtration, washed with water until free of chlorides, and dried in a vacuum desiccator. This amino-nitro-2-cyclohexyl-phenol, in which the amino and nitro groups are attached to the benzene ring, is a yellow crystalline product, soluble in acids and alkalies, and melting at 164.5° to 165° C.

Example 2

59.4 grams of 2,6-dinitro-4-cyclohexyl-phenol (described by Baroni et al. in Monatsch. 68, 251–60 (1936)), 151.5 grams of stannous chloride ($SnCl_2 \cdot 2H_2O$), and 118 grams of concentrated hydrochloric acid were reacted together in ethyl alcohol substantially as described in Example 1. The reacted mixture was filtered and poured into 400 parts of water to precipitate the desired amino-nitro-cyclohexyl-phenol product as an orange crystalline solid. This product was filtered off, washed with water, dried, dissolved in boiling benzene, filtered hot to remove any residual traces of hydrochloride derivative, and allowed to crystallize from the benzene solution. 2-amino-4-cyclohexyl-6-nitro-phenol is an orange-brown crystalline product melting at 165°–167° C.

In a similar manner, other dinitro-cyclohexyl-phenol compounds may be reduced to their corresponding amino-nitro derivatives. For example, by substituting 2,4-dinitro-5-cyclohexyl-phenol in the above examples, amino-nitro-5-cyclohexyl-phenol may be obtained.

The above-described compounds have been found useful as insecticides. For example, when tested against Fifth-Instar Silkworms by the Leaf-Sandwich method for the estimation of median lethal dose (Campbell and Filmer, Trans.

IV. International Cong. Ent. 523-533 (1929); and Campbell, Jour. Econ. Ent. 23: 357-370), the median lethal dose of amino-nitro-2-cyclohexyl-phenol was found to be 0.056 milligrams per gram of insect body weight. The corresponding value for acid lead arsenate (PbHAsO4) was found to be 0.089.

Other modes of applying the principle of my invention may be employed instead of those explained, change being made as regards the material employed, provided the product described in any of the following claims be thereby obtained I, therefore, particularly point out and distinctly claim as my invention:

1. An amino-nitro-cyclohexyl-phenol wherein the amino and nitro groups are attached to the benzene ring.

2. A compound having the following formula:

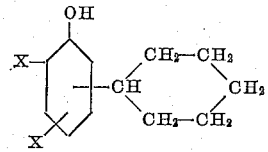

wherein one X represents an amino group, and the other X represents a nitro group.

3. An amino-nitro-6-cyclohexyl-phenol wherein the amino and nitro groups are attached to the benzene ring.

4. An amino nitro-6-cyclohexyl-phenol wherein the amino and nitro groups are attached to the benzene ring melting at 164.5°-165° C.

5. 2-amino-4-cyclohexyl-6-nitro-phenol.

FRANK B. SMITH.